United States Patent [19]

Tesch

[11] Patent Number: 4,804,813
[45] Date of Patent: Feb. 14, 1989

[54] WELDING DEVICE FOR A CYLINDRICAL TUBE

[76] Inventor: Klaus Tesch, Dorotheenstrasse 123, D-2000 Hamburg 60, Fed. Rep. of Germany

[21] Appl. No.: 166,792

[22] Filed: Mar. 3, 1988

Related U.S. Application Data

[63] Continuation of Ser. No. 913,654, Sep. 22, 1986, abandoned.

[30] Foreign Application Priority Data

Dec. 10, 1985 [DE] Fed. Rep. of Germany ....... 3543575
Jan. 23, 1986 [WO] PCT Int'l Appl. ... PCT/EP86/00026

[51] Int. Cl.$^4$ .............................................. B23K 9/02
[52] U.S. Cl. .................................. 219/60 A; 219/59.1
[58] Field of Search ................... 219/59.1, 60 A, 60 R, 219/125.11, 136

[56] References Cited

U.S. PATENT DOCUMENTS

| | | | |
|---|---|---|---|
| 3,722,778 | 3/1973 | Rohrberg et al. | 219/60 A |
| 3,748,433 | 7/1973 | Gwin et al. | 219/60 A |
| 3,777,103 | 12/1973 | White et al. | 219/60 A |
| 4,051,342 | 9/1977 | Stubbings | 219/60 A |
| 4,347,421 | 8/1982 | Mukuda et al. | 219/60 A |

FOREIGN PATENT DOCUMENTS

| | | |
|---|---|---|
| 1615332 | 5/1970 | Fed. Rep. of Germany . |
| 2103763 | 8/1971 | Fed. Rep. of Germany . |
| 2104114 | 7/1980 | Fed. Rep. of Germany . |
| 3000399 | 3/1982 | Fed. Rep. of Germany . |
| 1411529 | 8/1965 | France . |
| 1203992 | 9/1970 | United Kingdom . |

*Primary Examiner*—E. A. Goldberg
*Assistant Examiner*—Donovan
*Attorney, Agent, or Firm*—Chilton, Alix & Van Kirk

[57] ABSTRACT

The device for making a peripheral welding seam on a cylindrical tube (1) is attachable on the tube (1), is equipped with a rotary drive (15) for a rotational movement of the welding tool about the tube axis and is defined in that it has two rotatable rollers (10, 12) fastened to the device and arranged fixedly at a distance from one another in the peripheral direction and a third pivotable drive roller (15) connected to the drive. In the cross-sectional direction of the tube (1), the space between the rollers (10, 12, 15) has a larger dimension than the tube (1). When the dirve roller (15) is partially pivoted away, a lateral insertion orifice for the tube is consequently provided and likewise has larger dimensions than the tube (1).

18 Claims, 4 Drawing Sheets

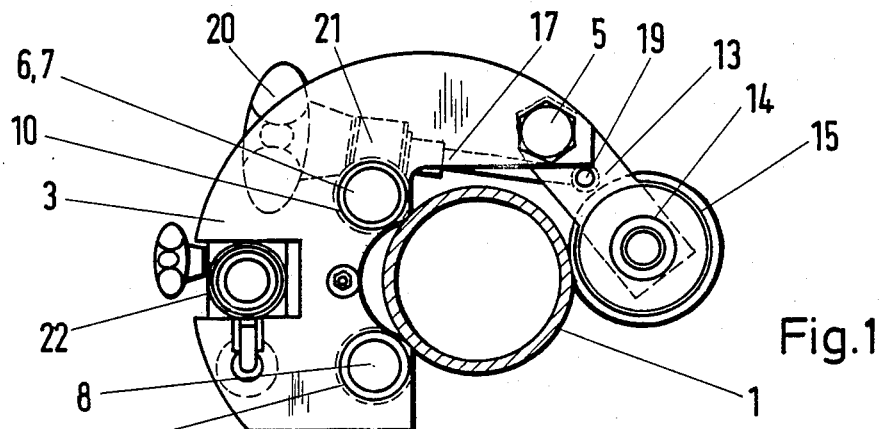
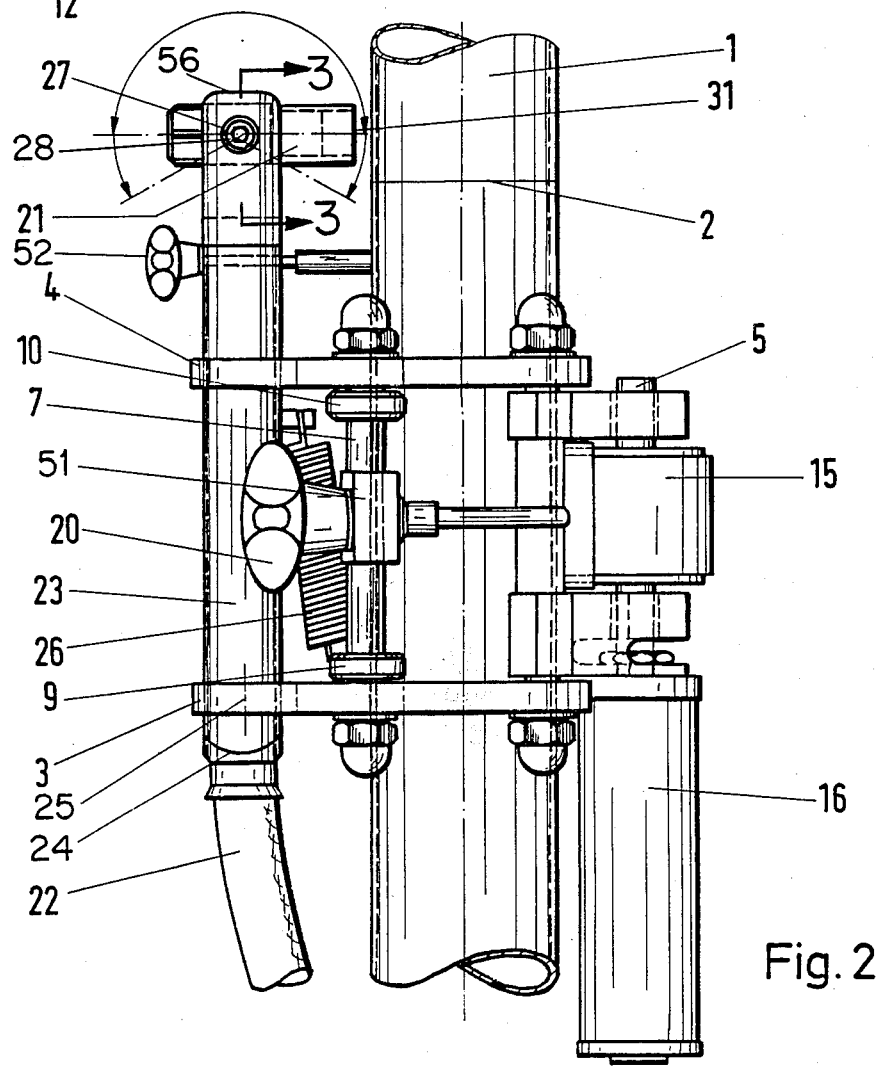

WELDING DEVICE FOR A CYLINDRICAL TUBE

This is a continuation of co-pending application Ser. No. 913,654 filed on Sept. 22, 1986 now abandoned.

The invention relates to a device for making a peripheral welding seam on a cylindrical tube, the device being attachable onto the tube and being equipped with a rotary drive for a rotational movement of the welding tool about the tube axis.

In many cases, peripheral welding seams have to be made on cylindrical tubes, in order to weld such tubes to one another. At the same time, the space available round the tube is often very limited. If, for example, pneumatic-tube conveyor lines are to be laid, the obvious aim is to arrange these lines as near as possible to ceilings or walls, so that they do not take up an unnecessarily large amount of space; moreover, several tubes can be arranged next to one another, so that the aim is to lay them as near as possible to one another. Consequently, the tube is not accessible from all sides for manual welding. Furthermore, it is often desirable to avoid the inaccuracy and unevenness of welding carried out by hand and to use automatic devices for preference.

A device having approximately the following mode of operation is therefore known. Part of the device is clamped onto the tube at the desired location. This part consists of a motor, the greatest longitudinal extent of which extends perpendicularly away from the tube, so that the motor can at the same time be used as a handle. The motor then drives a toothed ring which consists of several parts and which is arranged around the tube so that it surrounds the latter. This toothed ring is then driven by the motor; a welding tool connected in turn to the toothed ring thus executes a revolution round the tube, so that the peripheral welding seam can be made.

The disadvantage of this device is, on the one hand, that it has a complicated design. The opening of the toothed ring to place it round the tube and the subsequent closing to obtain a continuous toothed ring are complicated. Finally, the motor projecting perpendicularly from the tube also requires quite a large space, quite apart from the fact that the drive via the toothed ring can present problems if the toothed ring consisting of several parts is not perfect.

The object of the invention is to provide a device of the type mentioned at the beginning, which is of simpler design, works more reliably and takes up less room.

In the solution according to the invention, the device has two rotatable rollers arranged fixably at a distance from one another in the peripheral direction and a third pivotable drive roller connected to the drive, and in the cross-sectional direction of the tube the space between the rollers and, when the drive roller is pivoted away at least partially, a lateral insertion orifice have larger dimensions than the tube.

The device therefore has, in the center, a cavity which is sufficiently large to receive the tube. This cavity is limited on one side by an inertion orifice, the width of which is greater than the diameter of the tube to be inserted, so that the tube can be inserted into the cavity here. At the same time, opposite the insertion orifice, the tube comes into contact with two fixed rotatable rollers. Subsequently, the third roller is then pivoted against the tube, so that the tube is held at three points by rollers. The third roller is connected to the drive; when the latter is actuated, the device as a whole rotates about the fixed tube, and welding can be carried out.

At the same time, the greatest longitudinal extent of the motor, which is normally that in the axial direction, can be parallel to the tube, since then, in particular, there is no need for complicated force transmission, and the drive roller can be placed directly on the drive shaft of the motor.

To prevent the welding device from tilting, the rollers have to be of appropriately long length. It is expedient, however, to design the rollers as pairs of rollers, particularly the fixed rollers. Then, if the drive roller is arranged as a single roller between the two rollers of each pair of rollers, a stable mounting of the device is obtained.

Advantageously, the rollers are mounted on ball-bearings, so as not to require too high a drive power. The drive roller is also appropriately mounted on ball-bearings outside the motor, so that the drive shaft of the motor is not subjected to any lateral loads which could damage the motor.

Advantageously, the welding tool (welding head) is fastened to a pivotable arm, since in this way the welding head can easily be pivoted away from the tube for purposes of checking, adjustment and the like. If, at the same time, the pivotable arm is spring-loaded, the welding tool is on the one hand brought to a desired distance from the work-piece, but can nevertheless move away if a projection should touch the welding tool here, for example in the case of a damaged tube. By an appropriate choice of the spring, it is also possible to ensure that the pivotable arm is not only spring-loaded in the direction of the tube in the working position, but is also spring-loaded into an opening position in the opened position, so that the welding tool, when pivoted away, also remains in this position.

If the pivotable arm is also rotatable about its longitudinal axis, the device is easier to handle, and in particular the welding head is more readily accessible.

The device can be adapted more easily to different welding conditions, welding heads of different sizes or a possible wear of the welding head if it has an adjustable stop for the arm. At the same time, the distance between the welding tool and the tube can on the one hand be regulated if the pivotable arm comes up against a stop on the frame of the welding device. However, the adjustable stop can also be fastened to the pivotable arm and be in contact with the tube during operation.

If the welding tool is fastened pivotably to the arm, it can be set to different angles in relation to the tube's surface, so that, for example, tube sockets can be welded onto the tube. In particular, the welding tool can be pivotable through 360°, since in this way it can be specially versatile in use.

The said tubes are appropriately welded together by means of shielded arc welding. If, at the same time, the current and inert-gas lines pass through the pivot axis in the event that the welding tool is fastened pivotably to the arm, there is no need here for any additional lines which involve a high outlay and which would impede pivoting of the welding tool.

The device according to the invention is characterized in that it requires only very little room. According to the invention, in an advantageous embodiment, it projects less than 6 cm from the tube.

It should also be noted that the device can be used for different tube diameters, since the drive roller is pivotable and therefore the distances between the three rollers touching the tube are freely selectable within wider limits.

The device can also be used particularly for different tube diameters, that is to say for substantially larger and substantially smaller tube diameters, if the fixed rollers and the pivoting arms for the drive roller are arranged between two plates, to which they are connected releasably. To weld a tube of substantially larger or substantially smaller diameter than has previously been the case, it is then merely necessary to exchange these two plates.

If the device also has removable extension axles with additional rollers mounted rotatably on them, it can also be used for the tack welding of tubes not yet connected to one another, so that there is no need for an additional tack-welding device.

For tack-welding, the device does not even need to be placed on the tube, if the arm for a welding tool is fastened releasably to the device. Thus, for example, the arm together with the welding tool can be released from the device for the purposes of tack-welding or for other uses in which it is held by hand. The welding tool can thus be used in particularly varied and versatile manner.

If the arm can be introduced into outwardly open recesses in the plates and is held pivotably by means of a recess which is open in the direction of the tube extension and which surrounds a pivot axle, then on the one hand the pivotability and on the other hand the releasability of the arm are guaranteed.

At the same time, the pivoting arm is pressed onto the pivot axle by means of the open recess as a result of the force of the spring, since the pivoting arm is spring-loaded in the direction of the tube or into the open position. If the arm is to be released, it merely has to be pulled away from the pivot axle counter to the spring force. If the pivot axle is also adjustable in the tube direction, the exact position of the welding tool can easily be adjusted in the direction of the tube extension.

Finally, a variable stop can also be provided for the arm of the welding tool, this stop defining a position of rest, the welding tool being at a greater distance than normal from the tube to be welded. When this stop is then pivoted away, pushed away by being shifted laterally, or the like, the welding tool approaches the distance which is determined by a further stop and which corresponds to the ideal distance for welding. This second stop can also be arranged directly on the pivoting arm.

The invention is described below by means of an advantageous embodiment, with reference to the attached drawings. In the drawings:

FIG. 1 shows an end view of the device according to the invention, as seen in the longitudinal direction of the tube;

FIG. 2 shows a side view of the device of FIG. 1;

Figure 3:
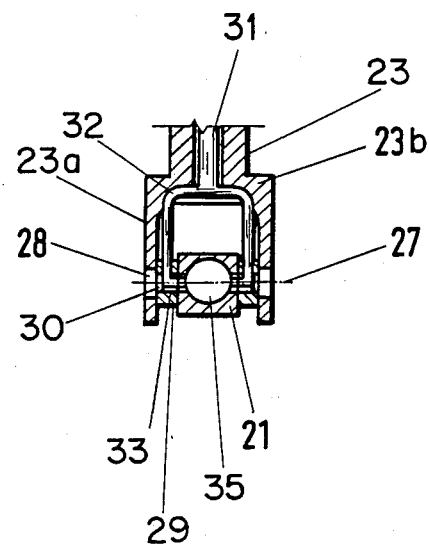
FIG. 3 shows a section through the welding head and its fastening along the line III—III of FIG. 2.

FIGS. 1 and 2 illustrate a tube 1 which is to be provided with a circumferential welding seam 2.

The device has two plate-shaped elements 3 and 4 which partially surround the tube 1. The two plates 3 and 4 are held at a distance from one another by several rod-shaped elements 5, 6, 7 and 8. Rollers are attached on the rod-shaped elements 7 and 8, specifically two rollers in the vicinity of each of the plate-shaped elements 3 and 4. Rollers 9 and 10 are attached on the rod-shaped element 7, and rollers (not shown) and 12 are attached on the rod-shaped element 8; these rollers are mounted on ball bearings. A drive roller 15 and a drive motor 16 connected to the latter are mounted pivotably on the rod-shaped element 5 by means of a rotatable lever arm 13 and a bearing 14 arranged on it. The pivoting position can be set by means of a screw bolt 17 fastened pivotably to the lever 13 at 19, a compression spring (not shown) arranged on the screw bolt 17, and a wing nut 20, the screw bolt 17, spring and wing nut or knob 20 interacting with an extension 51 fastened to the rod 7.

When the tube 1 is to be inserted, the drive roller 15 is first pivoted away downwards by means of the pivoting arrangement just described. After the tube 1 has been inserted, the roller 15 is then pivoted upwards again, until the three rollers 10, 12 and 15 touch the tube at three points, so that the device can then be rotated around the tube as a result of the actuation of the motor 16.

Welding is carried out by means of the welding head 21, to which inert gas and welding current are supplied via a hose 22. At the same time, the welding head 21 is fastened to a welding arm 23 which is mounted pivotably at 24, in such a way that it can be pivoted upwards in FIG. 2. At the same time, the pivot axle 24 is in turn rotatable about a rotary axle 25 which is perpendicular to the pivot axle 24 and which is mounted in the plate-shaped element 3, so that in FIG. 2 the pivoting arm cannot only be swung upwards, but subsequently also rotated about the arm longitudinal axis 25 towards the observer, that is to say laterally.

By means of a tension spring 26 fastened to the plate-shaped element 3 and to the welding arm 23, the welding arm and consequently the welding tool are pulled downwards, that is to say towards the tube. In the opened position, it is ensured that the welding arm remains in the opened position by a suitable choice of fastening points for the spring.

As shown in detail in FIG. 3, the pivoting arm includes a yoked end 56 including spaced apart elements 23a and 23b, between which the welding head 21 is mounted pivotably by means of an axle 27; at the same time, the welding head 21 can be clamped firmly in a desired pivoting position by means of a wing nut or set screw 28. The pivot axle 24 is preferably in the form of two opposed screws 27 and 28, having hexagonal heads 56.

Located on the pivot axle 27 next to the welding head 21 in FIG. 3 is an element located at 29 surrounding the pivot axle 27, this element surrounding the pivot axle 27 sealingly on the outside against head 56, but on the inside of it having a cavity which extends round the pivot axle 27 and which towards the inside is sealed off from the welding head 21 by suitable means. The inert gas is introduced via a pipeline 31 and a corresponding bore 32 into the element, from where it passes through a bore 33 in the pivot axle 27 and into the center bore 35 of the welding head, from where it can flow out of the welding head at the welding point. The electrical connection of the welding head 21 to the current source is made in the same way, the elements touching one another being connected electrically conductively to one another. Thus, the welding head can be adjusted into different pivoting positions, without hoses or electrical lines at the same time impeding pivotability.

Figure 4:
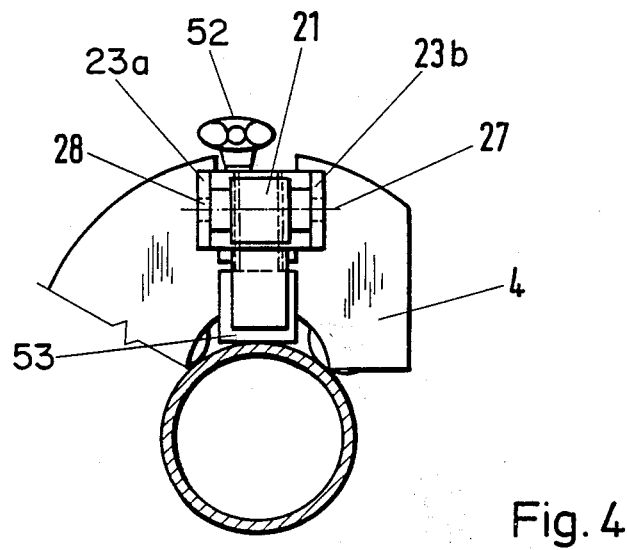
FIG. 4 shows a detailed view of a stop for the pivoting arm for the welding head, as seen from the same side as in FIG. 1.
Figure 5:
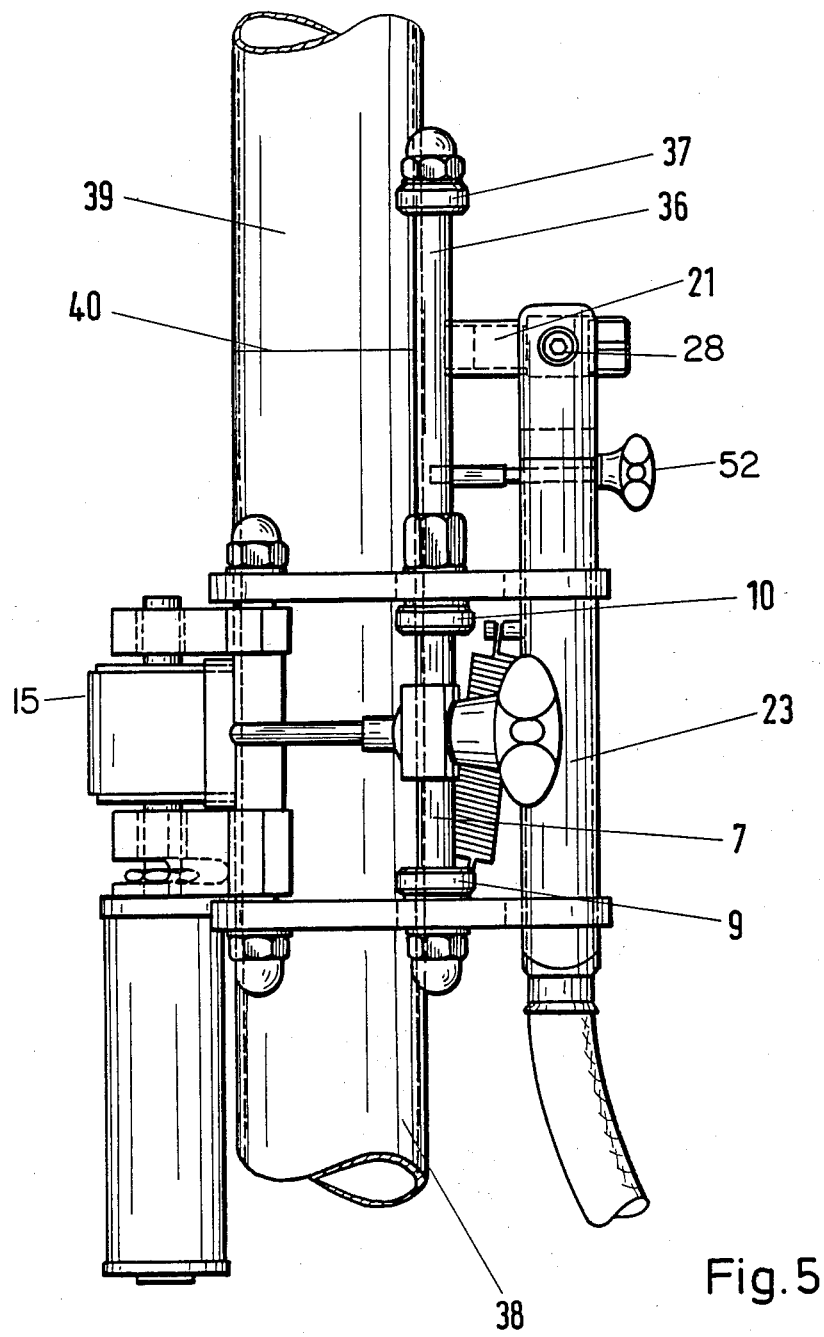
FIG. 5 shows, in a similar view to that of FIG. 2, a device with additional rollers attached.
Figure 6:
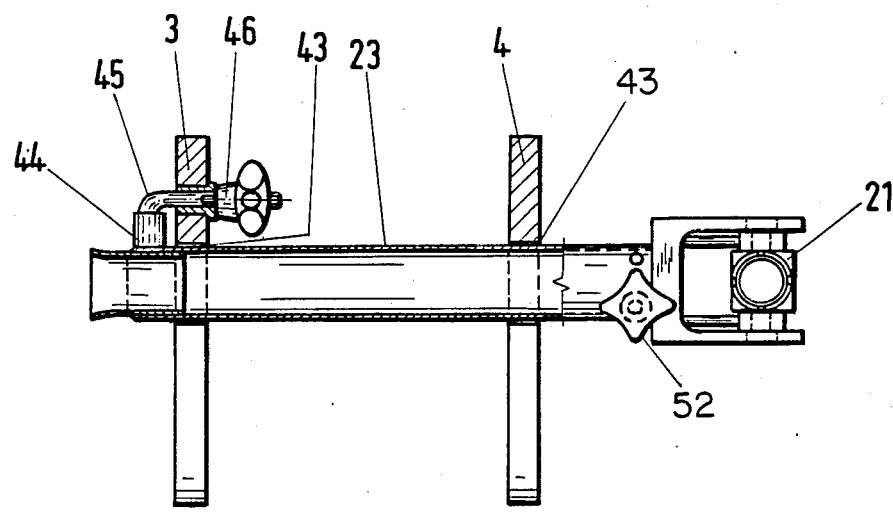
FIG. 6 shows a plan view of another type of mounting of the pivoting arm for the welding tool.

As shown in FIGS. 4, 5, and 6, the lower stop in the working position of the welding arm does not need to be the plate 4; on the contrary, a knurled screw, milled nut 53 or the like 52 can be provided for this purpose, so that the height of the welding head above the tube to be welded can be adjusted, by the screw 52 and maintained constant by the plate 53 riding the surface of the tube and serving as a reference position.

The device of FIG. 5 differs from the embodiment described hitherto, in that additional axles can be attached on the rod-shaped elements 7 or 8 to extend these rod-shaped elements. Of these additional axles, the additional axle 36 for the rod-shaped element 7 is shown in FIG. 5. Located at the end of each of these additional axles is an additional roller which is likewise mounted on ball bearings and of which one is shown at 37. The cylindrical surface of these additional rollers coincides with the extension of the cylindrical surfaces of the rollers on the corresponding rod-shaped elements 7 and 8. The mode of operation of this device is as follows. When a further tube 39 is to be attached to an already completed portion of a piping system (represented by tube section 38 in the Figure), tack-welding must first be carried out. For this purpose, the device according to the invention is fastened to the end of the already finished portion 38 of the pipeline, in such a way that the welding head 21 is located in the region of the tube end 40, against which the new tube 39 is to butt. In use, the arrangement is such that the fixed rollers are located at the bottom. In this position, the device is then fastened to the tube end as a result of the pivoting and tightening of the roller 15. The two additional axles for the rod-shaped elements 7 and 8 are then attached, so that the two additional rollers, of which one is shown at 37 in the Figure, form such a bearing surface for the new tube 39 that the tubes 38 and 39 merge into one another at the joint 40 without any offset. A tack-weld can then be made here at the bottom. Subsequently, the device is rotated through 180°, so that a tack-weld can be made at the top. When the continuous welding seam is subsequently made, the additional axles 36 can then be removed again, and this is also necessary when welding is to be carried out in the vicinity of pipe bends and the like.

In the embodiment of FIG. 6, the pivoting arm 23 for the welding tool 21 is guided through outwardly open recesses 43 in the plates 3 and 4 in a similar way to the previous embodiments (see, for example, Figure 1). In the rear part (that is to say, the part directed away from the welding tool 21), the arm 23 has a lateral projection 44 having a recess open to the rear, which can receive a pivot axle 45 bent in the form of an L, so that its front end and consequently also the region of the actual pivot axle can be shifted forwards or backwards by means of a wing nut 46, threaded knob 46 or the like. As a result, the pivoting arm 23 can easily be released fom the device by being pulled away forwards and upwards. On the other hand, it can be attached to the device again by pushing the recess of the projection 44 over the pivot axle 45; this position then remains stable, since the spring 26 (see FIG. 2) exerts a force directed which acts to bias the arm and projection 44 against the pivot axle 45.

I claim:

1. A device for making a peripheral welding seam on a cylindrical tube having a tube axis comprising:
 a frame adapted to surround at least a circumferential portion of a tube;
 first roller means in fixed position on the frame for contacting the tube;
 second roller means in fixed position on the frame for contacting the tube at a circumferentially spaced distance around the tube from the contact of the first roller means;
 third roller means pivotally mounted to the frame for contacting the tube at a circumferential position opposite the contact of the first and second roller means, whereby the frame is supported on the tube only by said first, second and third roller means;
 drive means mounted on the frame for rotating the third roller means, whereby the frame in turn rotates about the tube while the tube is in contact with the first, second and third roller means;
 welding means carried by the frame, for making a peripheral weld on the tube as the frame is rotated by the drive means;
 wherein the pivotal mounting of the third roller means permits displacement of only the third roller means away from the first and second roller means sufficient to create an insertion opening larger than the tube diameter, whereby a tube can be inserted into the frame laterally relative to the tube axis.

2. The device as claimed in claim 1, wherein the first and second roller means are each designed as pairs of rollers spaced apart parallel to the tube axis.

3. The device as claimed in claim 1, wherein the first, second, and third roller means are mounted on ball bearings.

4. The device as claimed in claim 1, wherein the welding means includes a welding tool fastened to an arm, the arm being pivotally mounted to the frame.

5. The device as claimed in claim 4, wherein the arm is spring-loaded.

6. The device as claimed in claim 4, wherein the pivotable arm is rotatable about the arm longitudinal axis which extends parallel to the tube axis.

7. The device as claimed in claim 4, further including an adjustable stop for the arm for regulating the distance of the welding tool from the tube.

8. The device as claimed in claim 1, wherein the welding means includes a welding tool mounted for pivotal movement about an welding tool axle transverse to the tube axis.

9. The device as claimed in claim 8, wherein the welding means includes a current line and an inert gas line, said lines passing through the welding tool axle.

10. The device as claimed in claim 1, wherein the device projects less than 6 cm radially from the tube circumference.

11. The device as claimed in claim 2, wherein at least one of the first and second roller means pairs are connected by an axle parallel to the tube axis, and further including a removable extension axle with at least one additional roller mounted rotatably thereon.

12. The device as claimed in claim 1 wherein the frame includes two spaced apart plates oriented transversely to the tube axis and the first and second roller means are releasably mounted between the plates, and the third roller means includes an arm pivotally mounted releasably to the plates.

13. The device as claimed in claim 7 wherein the stop is variable.

14. The device as claimed in claim 4, wherein the arm for the welding tool is fastened releasably to the frame.

15. The device as claimed in claim 14, wherein the frame includes two spaced apart plates oriented transversely to the tube axis, the first, second and third roller means being supported by said plates and wherein the welding tool arm can be introduced into outwardly open recesses in the plates and is held pivotably by means of a recess which is open in the direction of the tube extension and which surrounds a pivot axle.

16. The device as claimed in claim 15, wherein the pivot axle is adjustable in the axial direction of the tube.

17. The device as claimed in claim 1, wherein the welding means includes a welding tool that projects in the direction of the tube axis, outside the plates.

18. The device as claimed in claim 1 wherein the drive means includes a motor having a shaft axis coaxially connected to the third roller means.

* * * * *